(12) United States Patent
Yao et al.

(10) Patent No.: US 8,766,024 B2
(45) Date of Patent: Jul. 1, 2014

(54) PROCESS TO MITIGATE THE CORROSION OF OILS/FATS

(75) Inventors: Jianhua Yao, Bartlesville, OK (US);
Devadas Panjala, Pearland, TX (US);
Edward L. Sughrue, II, Bartlesville, OK (US); Eric W. Vetters, Bartlesville, OK (US); Bruce Randolph, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 860 days.

(21) Appl. No.: 12/939,808

(22) Filed: Nov. 4, 2010

(65) Prior Publication Data

US 2011/0124931 A1    May 26, 2011

Related U.S. Application Data

(60) Provisional application No. 61/263,104, filed on Nov. 20, 2009.

(51) Int. Cl.
| | | |
|---|---|---|
| *C07C 1/00* | (2006.01) | |
| *C10L 1/19* | (2006.01) | |
| *C10L 1/08* | (2006.01) | |
| *C10G 3/00* | (2006.01) | |
| *C10M 105/38* | (2006.01) | |

(52) U.S. Cl.
CPC .............. *C10M 105/38* (2013.01); *C10L 1/191* (2013.01); *C10G 2300/1011* (2013.01); *C10L 1/08* (2013.01); *C10G 3/00* (2013.01); *C10G 2300/301* (2013.01); *C10N 2230/12* (2013.01); *C10G 2300/4012* (2013.01); *C10L 2200/0446* (2013.01); *C10M 2207/401* (2013.01); *C10L 2290/06* (2013.01); *C10G 3/49* (2013.01); *C10G 2300/4006* (2013.01); *C10G 2400/04* (2013.01); *C10G 3/46* (2013.01); *C10L 2290/56* (2013.01)
USPC ................. 585/240; 585/242; 436/6; 436/60

(58) Field of Classification Search
CPC .................. C10G 35/04; C10G 45/06; C10G 2300/1011; C10G 2300/1014; C10G 2300/1018; C10G 7/10; C10G 9/16; C10G 75/02; C23F 11/00
USPC ................. 585/240, 242; 422/198; 436/6, 60; 252/183.12
See application file for complete search history.

(56) References Cited

U.S. PATENT DOCUMENTS

| | | | | | |
|---|---|---|---|---|---|
| 4,714,597 | A | * | 12/1987 | Trevino | 423/228 |
| 4,804,790 | A | * | 2/1989 | Schuett | 568/885 |
| 5,324,871 | A | * | 6/1994 | Carduck et al. | 568/884 |
| 5,749,947 | A | * | 5/1998 | Geke et al. | 106/14.42 |
| 6,890,877 | B2 | | 5/2005 | Meter | |
| 2006/0207166 | A1 | | 9/2006 | Herskowitz | |
| 2007/0175795 | A1 | * | 8/2007 | Yao et al. | 208/142 |
| 2008/0006676 | A1 | | 1/2008 | Rangaswamy et al. | |
| 2009/0078611 | A1 | | 3/2009 | Marker et al. | |
| 2009/0266743 | A1 | | 10/2009 | Yao | |
| 2009/0324820 | A1 | * | 12/2009 | Chartier | 427/239 |

FOREIGN PATENT DOCUMENTS

WO    2007003709    1/2009

OTHER PUBLICATIONS

PCT/US 10/55680 International Search Report and Written Opinion (PCT/ISA/220) Dated Jan. 11, 2011.

\* cited by examiner

*Primary Examiner* — Nina Bhat
(74) *Attorney, Agent, or Firm* — Phillips 66 Company

(57) ABSTRACT

It has been discovered that the residence time of oils/fats in metal apparatus, particularly in the upstream of a hydrotreating unit, for example, a heat exchanger and/or a storage/feed tank, can impact significantly on corrosiveness of oils/fats in combination with and without conventional hydrocarbons. In addition, it is also found that the presence of hydrogen in the metal apparatus can also inhibit the corrosion rate of oils/fats.

14 Claims, No Drawings

PROCESS TO MITIGATE THE CORROSION OF OILS/FATS

CROSS-REFERENCE TO RELATED APPLICATIONS

This application is a non-provisional application which claims benefit under 35 USC §119(e) to U.S. Provisional Application Ser. No. 61/263,104 filed Nov. 20, 2009, entitled "PROCESS TO MITIGATE THE CORROSION OF OILS/FATS" which is incorporated herein in their entirety.

STATEMENT OF FEDERALLY SPONSORED RESEARCH

None

FIELD OF THE DISCLOSURE

The present invention relates generally to a method of reducing corrosion rate of oils/fats. More specifically, the present invention relates to a method of reducing the corrosion rate of triglycerides in the upstream portion of a hydrotreating unit.

BACKGROUND OF THE DISCLOSURE

There is a national interest in the discovery of alternative sources of fuels and chemicals, other than from petroleum resources. As the public discussion concerning the availability of petroleum resources and the need for alternative sources continues, government mandates will require fuel range hydrocarbons to include, at least in part, hydrocarbons derived from sources besides petroleum. As such, there is a need to develop alternative sources for hydrocarbons useful for producing fuels and chemicals.

One possible alternative source of hydrocarbons for producing fuels and chemicals is the natural carbon found in plants and animals, such as for example, oils and fats. These so-called "natural" carbon resources (or renewable hydrocarbons) are widely available, and remain a target alternative source for the production of hydrocarbons. For example, it is known that oils and fats, such as those contained in vegetable oil, can be processed and used as fuel. "Bio-Diesel" is one such product and may be produced by subjecting a base vegetable oil to a transesterification process using methanol in order to convert the base oil to desired methyl esters. Oils and fats have also been successfully hydrotreated to produce hydrocarbons/fuel range hydrocarbons, which are called "Renewable-Diesel".

However, oftentimes, vegetable oil and fats can contain certain amount of free fatty acid. In addition, triglycerides that make up the bulk of both oils and fats may break down under heated conditions to produce additional free fatty acid. Although free fatty acid can be converted to hydrocarbon in the hydrotreater, they may cause potential corrosion issues in the upstream portion of a hydrotreating unit, such as, but not limited as, in a heat exchanger and/or feed/storage tank.

For crude oils and fractions containing carboxylic acids, commonly referred to as naphthenic acids, most refiners either dilute the acids with low acid feedstock, which requires buying more expensive non acidic crude, or upgrade metallurgy to alloys, which are resistant to the corrosion caused by these acids. These methods require substantial cost.

As such, development of a process for producing hydrocarbons from triglycerides, such as vegetable oils or fats, with reduced potential corrosion and avoided metallurgy upgrading would be a significant contribution to the art and to the economy.

BRIEF DESCRIPTION OF THE DISCLOSURE

It has been discovered that the residence time of oils/fats in a metal apparatus, particularly in the upstream portion of a hydrotreating unit; for example, a heat exchanger and/or a feed/storage tank, can impact significantly on corrosiveness of oils/fats in combination with and without conventional hydrocarbons. In addition, it is also found that the presence of hydrogen in the metal apparatus can also inhibit the corrosion rate of oils/fats.

In one embodiment of the present invention, a process is disclosed comprising of passing a feedstock comprising a triglyceride through a metal apparatus, wherein the temperature in the metal apparatus is in the range of from about 150° C. to about 550° C., wherein the pressure in the metal apparatus is in the range of from about 50 psig to about 2000 psig, and wherein the residence time for the feedstock in the metal apparatus is in the range of from 0.001 hour to about 5 hour.

In another embodiment of the present invention, a process is disclosed comprising of passing a feedstock comprising a triglyceride with a co-feed gas through a metal apparatus, wherein the temperature in the metal apparatus is in the range of from about 150° C. to about 550° C., wherein the pressure in the metal apparatus is in the range of from about 50 psig to about 2000 psig, wherein the residence time for the feedstock in the metal apparatus is in the range of from 0.001 hour to about 5 hour, and where in the gas co-feed rate is in the range of from 100 standard cubic feet/barrel of liquid (scf/b) to about 10,000 scf/b.

In another embodiment of the present invention, a process is disclosed passing a feedstock comprising a triglyceride through a metal apparatus, wherein the temperature in the metal apparatus is in the range of from about 150° C. to about 550° C., and wherein the residence time for the feedstock in the metal apparatus is in the range of from 0.001 hour to about 5 hour.

In another embodiment of the present invention, a process is disclosed passing a feedstock comprising a triglyceride with a co-feed gas through a metal apparatus, wherein the temperature in the metal apparatus is in the range of from about 150° C. to about 550° C., wherein the residence time for the feedstock in the metal apparatus is in the range of from 0.001 hour to about 5 hour, and where in the gas co-feed rate is in the range of from 100 scf/b to about 10,000 scf/b.

In yet another embodiment of the present invention, a process is disclosed comprising of reacting a feed exiting the metal apparatus from any one of the previous embodiments with a hydrotreating catalyst in a reaction zone under a condition sufficient to produce a reaction product containing fuel range hydrocarbons.

As in any of the previous embodiment, the feed may further comprise a hydrocarbon boiling in the temperature range of from about 25° C. to about 760° C.

Other objects, advantages and embodiments of the invention will be apparent from the following detailed description of the invention and the appended claims.

DETAILED DESCRIPTION OF EMBODIMENTS OF THE INVENTION

According to one aspect of the present invention, a process is disclosed comprising of passing a feedstock comprising a triglyceride through a metal apparatus.

The term, "triglyceride," is used generally to refer to any naturally occurring ester of a fatty acid and/or glycerol having the general formula $CH_2(OCOR_1)CH(OCOR_2)CH_2OCOR_3$, where $R_1$, $R_2$, and $R_3$ are the same or different, and may vary in chain length and structure. Vegetable oils, such as for example, canola and soybean oils contain triglycerides with three fatty acid chains. Useful triglycerides in the present invention include, but are not limited to, triglycerides that may be converted to hydrocarbons when contacted under suitable reaction conditions. Examples of triglycerides useful in the present invention include, but are not limited to, vegetable oils including soybean and corn oil, peanut oil, sunflower seed oil, coconut oil, babassu oil, poppy seed oil, almond oil, hazelnut oil, walnut oil, olive oil, avocado oil, sesame, oil, tall oil, cottonseed oil, palm oil, rice bran oil, canola oil, cocoa butter, shea butter, butyrospermum, wheat germ oil, illipse butter, meadowfoam, seed oil, rapeseed oil, borange seed oil, linseed oil, castor oil, vernoia oil, tung oil, jojoba oil, ongokea oil, yellow grease (for example, as those derived from used cooking oils), and animal fats, such as tallow animal fat, beef fat, and milk fat, and the like and mixtures and combinations thereof.

Triglyceride may be passed through the metal apparatus alone or in combination with other hydrocarbons. The hydrocarbons generally boil at a temperature of from about 25° C. to about 760° C. Examples of suitable hydrocarbons include middle distillate fuels. Middle distillate fuels generally contain hydrocarbons that boil in the middle distillate boiling range in the range from about 150° C. to about 400° C. Typical middle distillates may include for example, jet fuel, kerosene, diesel fuel, light cycle oil, light coker gas oil, atmospheric gas oil, and vacuum gas oil. If a middle distillate feed is employed in the process of the present invention, the feed generally may contain a mixture of hydrocarbons having a boiling range (ASTM D86) of from about 150° C. to about 400° C. In addition, the middle distillate feed may have a mid-boiling point (ASTM D86) of greater than about 175° C. A middle distillate feed employed in one embodiment of the present invention is diesel fuel. In addition to middle distillate fuels, other suitable hydrocarbons include, but are not limited to, gasoline, naphtha, and atmospheric tower bottoms.

In addition, one or more triglycerides can mix with a middle distillate feed.

The amount of triglyceride used as the feedstock in the present invention may vary depending on the size of the commercial process. Generally, triglyceride-containing materials are present in an amount in the range of from about 0.1 to about 100 percent by weight, based on the total weight percent of the mixture. In one embodiment of the present invention, the triglyceride-containing material is present in an amount of from about 2 weight percent to about 50 weight percent, based on the total weight of the mixture. In another embodiment of the present invention, the triglyceride-containing material is present in an amount of 15 weight percent, based on the total weight of the mixture.

In one embodiment of the present invention, the feedstock, with or without hydrocarbons, may be passed through the metal apparatus with a co-feed gas. Generally, the co-feed gas is selected from the group consisting of hydrogen, nitrogen, helium, carbon monoxide, and carbon dioxide. In one embodiment, the co-feed gas can be hydrogen. It has been discovered that the presence of hydrogen in the metal apparatus particularly in the upstream of a hydrotreating unit, for example, a heat exchanger, can impact on corrosiveness of oils/fats in combination with and without conventional hydrocarbons. In one embodiment of the present invention, the gas co-feed rate is in the range of from 100 scf/b to about 10,000 scf/b, in another embodiment of the present invention, the gas co-feed rate is in the range of from about 200 scf/b to about 8,000 scf/b, in yet another embodiment of the present invention, the gas co-feed rate is between 500 scf/b to 5000 scf/b.

The metal apparatus in accordance with an embodiment of the present invention can be any suitable apparatus that enables the passing through of the feedstock, hydrocarbons, and/or co-feed gas. The metal apparatus in accordance with an embodiment of the present invention should also have the control of a set of the operating conditions that include total temperature, pressure, liquid feed rate, residence time, and/or gas co-feed rate. The process may be carried out in a batch, semi-continuous, or continuous operation. In one embodiment of the present invention, a batch operation in a conventional autoclave is used. In another embodiment of the present invention, the metal apparatus may be a heat exchanger and/or feed/storage tank in the upstream portion of a hydrotreating unit. A usable heat exchanger can be a shell and tube heat exchanger or a welded plate and frame heat exchanger.

In one embodiment of the present invention, the temperature in the metal apparatus is in the range of from about 150° C. to about 550° C., in another embodiment of the present invention, the temperature in the metal apparatus is in the range of from about 200° C. to about 500° C., in another embodiment of the present invention, the temperature in the metal apparatus is about 350° C.

In one embodiment of the present invention, the pressure in the metal apparatus is in the range of from about 50 psig to about 2000 psig, in another embodiment of the present invention, the pressure in the metal apparatus is in the range of from about 150 psig to about 1500 psig, in another embodiment of the present invention, the pressure in the metal apparatus is about 600 psig.

The residence time for the feedstock passing through the metal apparatus will depend upon the type of the feedstock, concentration, pressure, temperature, and the metallurgy of the metal apparatus. It has been discovered that the residence time of oils/fats in metal apparatus, particularly in the upstream of a hydrotreating unit, for example, a heat exchanger and a feed/storage tank, can impact significantly on corrosiveness of oils/fats in combination with and without conventional hydrocarbons. In one embodiment of the present invention, the residence time for the feedstock passing through the metal apparatus is in the range of from about 0.001 hour to about 5 hour, in another embodiment of the present invention, the residence time for the feedstock passing through the metal apparatus is in the range of from about 0.005 hour to about 2.0 hour, in another embodiment of the present invention, the residence time for the feedstock passing through the metal apparatus is about 0.01 hr to 1.0 hr.

Another aspect of the present invention is a process comprising, contacting a feedstock exiting from the metal apparatus from any one of the previous embodiments with a hydrotreating catalyst in a reaction zone under a condition sufficient to produce a reaction product containing fuel range hydrocarbons.

In one embodiment of the present invention, such fuel range hydrocarbon is diesel boiling range hydrocarbons, and such condition includes a pressure of less than about 2000 psig and a temperature in the range of from about 260° C. to about 430° C.

Useful catalyst compositions include any catalysts which may effective in the conversion of triglycerides to hydrocarbons when contacted under suitable reaction conditions. Examples of suitable catalysts include hydrotreating catalysts. Examples of hydrotreating catalysts useful in one embodiment of the present invention include, but are not limited to, materials containing compounds selected from Group VI and Group VIII metals, and their oxides and sulfides. Examples of suitable support materials for the hydrogenation catalysts include, but are not limited to, silica, silica-alumina, aluminum oxide ($Al_2O_3$), silica-magnesia, silica-titania and acidic zeolites of natural or synthetic origin. Examples of hydrotreating catalysts include but are not limited to alumina supported cobalt-molybdenum, nickel sulfide, nickel-tungsten, cobalt-tungsten and nickel-molybdenum. Other catalysts useful in the present invention are sorbent compositions. Sorbent compositions can be used in either the fixed-bed reactor or the fluidized bed reactor embodiments.

According to one embodiment of the present invention, the reaction zone may comprise any suitable type of reactor. Exemplary reactors include fixed bed reactors and fluidized bed reactors. Generally, the reaction conditions at which the reaction zone is maintained generally include a temperature in the range of from about 260° C. to about 430° C. In another embodiment, the temperature is in the range of from about 280° C. to about 420° C. The reaction conditions at which the reaction zone is maintained generally include a pressure less than about 2000 psig, and more particularly between about 100 psig to about 1500 psig. In one embodiment employing a fixed bed reactor, the pressure is maintained between about 100 psig to about 1500 psig. In one embodiment employing a fluidized bed reactor, the pressure is maintained between about 400 psig to about 1000 psig.

The reaction product, in accordance with the present invention, generally comprises gas and liquid fractions containing hydrocarbon products, which include, but are not limited to, diesel boiling-range hydrocarbons. The reaction product generally comprises long chain carbon compounds having 6-20 or more carbon atoms per molecule. Preferably, the reaction product comprises carbon compounds having 15 to 18 or more carbon atoms per molecule. In addition, the reaction product can further comprise by-products of carbon monoxide and carbon dioxide ($CO_x$).

The following examples are presented to further illustrate the present invention and are not to be construed as unduly limiting the scope of this invention.

EXAMPLE

Material and Method

Corrosion tests were carried out in both continuous flow small reactor cell and continuous flow autoclave reactor cell for 7 days at 650 F and 600 psig which mimic the conditions of a heat exchanger for a typical hydrotreater. The liquid feed used in these tests was prepared by mixing 15 vol % technical tallow from an animal processing facility with a refinery-produced diesel feed. Both Carbon Steel (CS) and 9-Chrome steel (9Cr) coupons were used in the tests and corrosion rates were calculated from coupon weight loss measurements.
Results:

Analysis was done on the effect of different tallow-diesel mixtures and effect of $H_2$ & $N_2$ co-feed on corrosion rates using Carbon Steel (CS) & 9-Chrome steel (9Cr) metallurgies under hydrotreater conditions.

It is found that residence time of oils/fats in heat exchanger can impact significantly on corrosiveness of oils/fats in combination with and without conventional hydrocarbons, for example diesel. As shown in Table 1, corrosion rate is lower and within acceptable limits at the shorter residence time. For example, when the residence time of tallow/diesel mixture in the heated zone was reduced from 1.1 hrs to 0.05 hrs, the corrosion rate in $N_2$ co-feed for carbon steel (CS) coupon was reduced from 446 mpy to 2.7 mpy and similar trends were found for 9-Chrome steel (9Cr) coupon. Overall test results demonstrate that the residence time has significant impact on corrosion rates of both CS and 9Cr coupons in both hydrogen and nitrogen environments. As residence time increased the corrosion rates of the coupons are increased drastically. Therefore, it is critical to control the residence time to mitigate the corrosion issue.

In addition, it was also found that the presence of hydrogen in the testing system can also inhibit the corrosion rate of oils/fats. For example, at residence time of 1.1 hr, corrosion rate of carbon steel coupon in $N_2$ environment was 446 mpy. This corrosion rate was reduced to 15.7 mpy when $N_2$ was replaced with $H_2$. A similar trend was noticed with 9-Chrome steel (9Cr) coupon. Overall the hydrogen feed gas has an enormous inhibition effect compared to nitrogen gas on both CS and 9Cr coupon corrosion rates, which is evident from percentage of inhibition data presented in Table 1.

TABLE 1

Corrosion rates summarized results for CS and 9Cr at different residence time with 0, 5, 15, 50% tallow-diesel feed along with $N_2$ and $H_2$ cofeeds.

| % Tallow in Diesel | Coupon Type | Carbon Steel | | 9-Chrome steel | |
|---|---|---|---|---|---|
| | Residence time, hr | 0.05 | 1.1 | 0.05 | 1.1 |
| 0% | Corrosion rate in $H_2$, mpy | 0.41 | 1.05 | 0.56 | 0.61 |
| 5% | Corrosion rate in $H_2$, mpy | | 1.03 | | 0.94 |
| 15% | Corrosion rate in $H_2$, mpy | 0.08 | 15.7 | 0.22 | 1.83 |
| | Corrosion rate in $N_2$, mpy | 2.7 | 446 | 1.8 | 288 |
| | % inhibition by $H_2$ | 97 | 96 | 88 | 99 |
| 50% | Corrosion rate in $H_2$, mpy | 0.34 | | 0.25 | |

The results shown in the above examples, clearly demonstrate that the present invention is well adapted to carry out the objects and attain the ends and advantages mentioned as well as those inherent therein. Reasonable variations, modifications and adaptations may be made within the scope of this disclosure and the appended claims without departing from the scope of the invention. While this invention has been described in detail for the purpose of illustration, it should not be construed as limited thereby but intended to cover all changes and modifications within the spirit and scope thereof.

What is claimed is:

1. A process comprising:
passing a feedstock comprising triglycerides and fatty acids with a co-feed gas through a metal apparatus in the absence of a catalyst, wherein the temperature in said metal apparatus is in the range of from about 150° C. to about 550° C., wherein the pressure in said metal apparatus is in the range of from about 50 psig to about 2000 psig, wherein the residence time for said feedstock in said metal apparatus is-in the range of from 0.001 hour to about 0.05 hour, wherein the gas co-feed rate is in the range of from 100 scf/b to about 10,000 scf/b, wherein said co-feed gas inhibits corrosion of the metal apparatus by said feedstock.

2. The process in accordance with claim 1, wherein said metal apparatus is a heat exchanger or an autoclave.

3. The process in accordance with claim 1, wherein said metal apparatus is a feed or storage tank.

4. The process in accordance with claim 1, further comprising a step of reacting a feedstock exiting said metal apparatus with a hydrotreating catalyst in a reaction zone under a condition sufficient to produce a reaction product containing fuel range hydrocarbons.

5. The process in accordance with claim 4 wherein said fuel range hydrocarbons is diesel boiling range hydrocarbons, wherein said condition includes a pressure of less than about 2000 psig and a temperature in the range of from about 260° C. to about 430° C.

6. The process of claim 1, wherein the co-feed gas comprises a member of the group consisting of hydrogen, nitrogen, helium, carbon monoxide, and carbon dioxide.

7. The process of claim 1, wherein the co-feed gas is hydrogen, and reacts with the feedstock to decrease the corrosiveness of the feedstock in said metal apparatus.

8. A process comprising:
passing a feedstock comprising a mixture of triglycerides, fatty acids and conventional hydrocarbons that boil in the temperature range of from about 25° C. to about 760° C. with a co-feed gas through a metal apparatus in the absence of a catalyst, wherein the temperature in said metal apparatus is in the range of from about 150° C. to about 550° C., wherein the pressure in said metal apparatus is in the range of from about 50 psig to about 2000 psig, wherein the residence time for said feedstock in said metal apparatus is in the range of from 0.001 hour to about 0.05 hour, wherein the gas co-feed rate is in the range of from 100 scf/b to about 10,000 scf/b, wherein said co-feed gas inhibits corrosion of the metal apparatus by said feedstock.

9. The process of claim 8, further comprising a step of reacting a feedstock exiting said metal apparatus with a hydrotreating catalyst in a reaction zone under a condition sufficient to produce a reaction product containing fuel range hydrocarbons.

10. The process in accordance with claim 9, wherein said fuel range hydrocarbons is diesel boiling range hydrocarbons, wherein said condition includes a pressure of less than about 2000 psig and a temperature in the range of from about 260° C. to about 430° C.

11. The process of claim 8, wherein the co-feed gas comprises a member of the group consisting of hydrogen, nitrogen, helium, carbon monoxide, and carbon dioxide.

12. The process of claim 8, wherein the co-feed gas is hydrogen, and reacts with the feedstock to decrease the corrosiveness of the feedstock in said metal apparatus.

13. The process in accordance with claim 8, wherein said metal apparatus is a heat exchanger or an autoclave.

14. The process in accordance with claim 8, wherein said metal apparatus is a feed or storage tank.

* * * * *